US009671826B2

(12) United States Patent
Levesque et al.

(10) Patent No.: US 9,671,826 B2
(45) Date of Patent: Jun. 6, 2017

(54) METHOD AND APPARATUS OF BODY-MEDIATED DIGITAL CONTENT TRANSFER AND HAPTIC FEEDBACK

(71) Applicant: IMMERSION CORPORATION, San Jose, CA (US)

(72) Inventors: Vincent Levesque, Montreal (CA); Ali Modarres, San Jose, CA (US); Amaya Becvar Weddle, San Jose, CA (US); David M. Birnbaum, Oakland, CA (US); Juan Manuel Cruz-Hernandez, Montreal (CA); Henry Da Costa, Montreal (CA)

(73) Assignee: Immersion Corporation, San Jose, CA (US)

( * ) Notice: Subject to any disclaimer, the term of this patent is extended or adjusted under 35 U.S.C. 154(b) by 23 days.

(21) Appl. No.: 14/106,275

(22) Filed: Dec. 13, 2013

(65) Prior Publication Data

US 2015/0145656 A1    May 28, 2015

Related U.S. Application Data

(60) Provisional application No. 61/909,797, filed on Nov. 27, 2013.

(51) Int. Cl.
    *G08B 6/00*     (2006.01)
    *G06F 1/16*     (2006.01)
    (Continued)

(52) U.S. Cl.
    CPC .............. *G06F 1/163* (2013.01); *G06F 3/011* (2013.01); *G06F 3/016* (2013.01); *G08B 6/00* (2013.01);
    (Continued)

(58) Field of Classification Search
    CPC .................... G08B 6/00; G06F 3/016
    (Continued)

(56) References Cited

U.S. PATENT DOCUMENTS 9,293,015 B2 *  3/2016  Mar ................... G08B 6/00
2003/0016207 A1  1/2003  Tremblay et al.
(Continued)

FOREIGN PATENT DOCUMENTS

EP        1 916 592 A2    4/2008

OTHER PUBLICATIONS

Extended Search Report as issued in European Patent Application No. 14195196.2, dated May 13, 2015.

*Primary Examiner* — Hongmin Fan
(74) *Attorney, Agent, or Firm* — Medler Ferro Woodhouse & Mills PLLC

(57) ABSTRACT

The disclosure relates to systems and methods of transferring/storing digital content, and/or providing haptic feedback via wearable devices directly or indirectly responsive to an event such as a communication, an event occurring in an electronic environment and/or physical environment, the transfer of digital content, and/or other events. Wearable devices may be worn at various locations on a body of the user. Each location may be associated with a wearable device. Different haptic feedback may be provided at different locations based on the event such that the events may be distinguished or otherwise identified based on the location at which haptic feedback is provided. The locations may be stored in a configuration of wearable devices that act as a mapping of the wearable devices. The locations and/or haptic feedback itself may be varied based on the context and/or properties such as size of digital content or status of the transfer.

20 Claims, 7 Drawing Sheets

(51) Int. Cl.
*G06F 3/01* (2006.01)
*H04M 1/725* (2006.01)

(52) U.S. Cl.
CPC ...... *H04M 1/7253* (2013.01); *H04M 1/72569* (2013.01)

(58) Field of Classification Search
USPC ................ 340/407.1, 407.2, 573.1; 434/114
See application file for complete search history.

(56) References Cited

U.S. PATENT DOCUMENTS

| | | | |
|---|---|---|---|
| 2003/0067440 A1* | 4/2003 | Rank | 345/156 |
| 2009/0096746 A1* | 4/2009 | Kruse et al. | 345/156 |
| 2010/0217413 A1* | 8/2010 | Seiler | H04R 3/12 |
| | | | 700/94 |
| 2011/0063208 A1 | 3/2011 | Van Den Eerenbeemd et al. | |
| 2011/0148607 A1* | 6/2011 | Zeleny | 340/407.1 |
| 2013/0207792 A1* | 8/2013 | Lim et al. | 340/407.1 |
| 2014/0218184 A1 | 8/2014 | Grant et al. | |
| 2014/0336669 A1* | 11/2014 | Park | A61B 19/2203 |
| | | | 606/130 |

* cited by examiner

METHOD AND APPARATUS OF BODY-MEDIATED DIGITAL CONTENT TRANSFER AND HAPTIC FEEDBACK

CROSS-REFERENCE TO RELATED APPLICATIONS

This Application claims priority to U.S. Provisional Patent Application Ser. No. 61/909,797, filed Nov. 27, 2013, which is hereby incorporated by reference herein in its entirety.

FIELD OF THE INVENTION

The disclosure relates to systems and methods of transferring digital content, storing digital content, and/or providing haptic feedback directly or indirectly responsive to an event such as the transfer of digital content via wearable devices, a communication, an event occurring in an electronic environment, an event occurring in a physical environment, and/or other events.

BACKGROUND OF THE INVENTION

Wearable devices that are generally portable and are configured to be attached to or otherwise carried on a body part of a user may provide haptic feedback. However, such wearable devices generally do not provide a context in which the haptic feedback is provided and are not mapped to different parts of the body. As such, the haptic feedback provided at wearable devices worn at various locations of the body may be limited in the types of information they convey.

SUMMARY OF THE INVENTION

The disclosure relates to systems and methods of transferring digital content, storing digital content, and/or providing haptic feedback directly or indirectly responsive to an event such as the transfer of digital content via wearable devices throughout various locations of the body of the user, a communication, an event occurring in an electronic environment, and/or other events, according to an aspect of the invention. Wearable devices may be worn at the various locations on the body of the user. The locations may be automatically detected and/or manually configurable, facilitating rich interactions with the wearable devices. For example, the locations may be automatically detected based on received signal strength or other localization techniques. Alternatively or additionally, the user may map different wearable devices to different locations.

Each wearable device may include a haptic output device, a storage medium, a processor, an input device, and/or other components. A wearable device may have capabilities that are different than the capabilities of another wearable device. For example, a given wearable device may act as a dedicated storage device, a dedicated haptic feedback device, have another dedicated function, and/or perform a combination of functions. In some implementations, the system may register each wearable device to obtain registration information such that information related to each wearable device is stored and known by the system. The registration information may include a device identifier, information indicating device capabilities (e.g., haptic output functions, storage functions, input functions, etc.), a location on a body at which the wearable device is to be worn, communication ports/protocols used to communicate with the wearable device, and/or other information that can be obtained about the wearable device.

The system may receive information related to an event and respond accordingly. Information related to the event may include an indication of an incoming or outgoing communication (e.g., phone call, electronic mail, Short Message Service text message, etc.), information indicating interactions in an electronic environment (e.g., a user interface, gaming application, etc.), sensor information that describes a physical environment, which may include image information from which various events may be determined based on image processing, an indication of a transfer of digital content, and/or other events to which the system may respond. The response may include causing haptic feedback to be provided and/or causing the transfer of the digital content to occur.

For example, the system may receive information related to an incoming communication or interaction occurring in a user interface. The system may identify a wearable device that should provide haptic feedback based on the information related to the event. The system may identify the wearable device from among a plurality of wearable devices. In some of these instances, different types of events may be associated with different locations at which to provide haptic feedback. For example, when the system receives information related to an incoming phone call, the system may cause a haptic feedback to be provided at a wearable device that is associated with a wrist location on a user, which may include an individual or group of individuals that wear at least one wearable device. On the other hand, when the system receives information related to an incoming SMS text message, the system may cause a haptic feedback to be provided at a wearable device that is associated with a leg location. Other types of events and information related to events may be used to provide haptic feedback at different locations as well. In this manner, the system may provide haptic feedback at different locations based on different types of events. The system may cause haptic feedback to be provided at devices known by the system other than the wearable devices as well.

In another example, the system may receive information related to a transfer of digital content. Digital content may be transferred to and/or from a wearable device having a storage medium such that a user may conceptually transfer information to and/or from various locations on the body of the user (e.g., to and/or from wearable devices mapped to the locations on the body). As such, a wearable device may act as a source of the digital content and/or a destination of the digital content. The system may provide haptic feedback at the various locations of the body of the user via a wearable device having a haptic output device to indicate a status of the transfer.

The system may cause the haptic feedback to be provided in coordination with a plurality of wearable devices and in coordination with the transfer. The coordinated haptic feedback may provide a sensation of the digital content "moving" through the body along a path from a source to a destination, whether the source and/or destination of the digital content includes a wearable device or a remote device that is not worn by the user. The path through which the haptic feedback is provided may be based on the mapping of the wearable devices. Other configurations and patterns of haptic feedback may be provided by coordinating the wearable devices to simultaneously or serially provide the haptic feedback as well.

The system may provide haptic feedback that indicates properties of the transfer such as a type of network used to make the transfer, the type of digital content being transferred, a size of the digital content, whether the digital content is compatible with the destination, and/or other information related to the transfer that can be conveyed by haptic feedback.

In some implementations, the system may associate a given location and/or a given wearable device with a context. For example, the system may receive an indication from the user that a particular location such as a "back pocket" location on the body is to be associated with an electronic wallet or purchase context. In the foregoing example, when the system detects that a purchase is occurring in association with the user (e.g., the system receives an indication that an electronic wallet is being used in a purchase transaction), the system may associate the purchase transaction with the location "back pocket," identify the wearable device associated with the "back pocket" location, and store digital content such as an electronic receipt at the wearable device.

Continuing with the foregoing example, the system may cause a haptic feedback to be provided via a haptic output device of a wearable device (which may be the same or different device than the wearable device at which the receipt is stored) associated with the "back pocket." The haptic feedback may provide a status of the purchase transaction such as to indicate that the purchase authorization is pending, has been authorized, is denied, etc.

The system may detect input from the user that initiates or accepts the transfer of digital content. For example, the system may detect an input at a wearable device that initiates the transfer of digital content from the wearable device to another device such as another wearable device, a remote device, and/or other device that can accept the transfer. Likewise, the system may detect an input at a wearable device that accepts the transfer of digital content from another device.

In some implementations, the digital content need not be transferred to or from a particular wearable device. For example, the particular wearable device may not store the digital content but may instead be associated with another device at which the digital content is stored. In these implementations, the wearable device may be associated with both the location on the body of the user and an identity or address of a device at which the digital content is stored.

For example, the system may associate a wearable device at a leg of the user with a remote cloud storage device and may associate another wearable device at an arm of the user with a local storage device at a home computer. The system may provide at the leg of the user haptic feedback related to digital content transfers associated with the remote cloud storage device and/or provide at the arm of the user haptic feedback related to digital content transfers associated with the local storage device. Likewise, the system may initiate transfers to and/or from the remote cloud storage device based on input provided by the user at the leg of the user (e.g., the wearable device associated with the leg). In this manner, the digital content may be conceptually stored at or transferred from a body part of the user even though the digital content is not actually stored at a wearable device associated with the body part.

In some implementations, the wearable devices may be communicably coupled to one another. For example, the devices may form ad hoc wired or wireless networks. In some implementations, the wearable devices may be controlled in a decentralized manner. For example, the wearable devices may be daisy-chained or otherwise serially connected to one another such that one wearable device provides commands to another wearable device, which provides commands to yet another wearable device, and so on. In some implementations, the wearable devices may be controlled in a centralized manner. For example, a wearable device and/or other device may provide commands and/or other signals to the wearable devices.

A given wearable device may be coupled to other devices such as remote storage devices that are not worn or carried by the user or a computing device that is controlled by the user such as a smartphone or other device. In some implementations, the computing device or other device may act as the centralized controller.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The disclosure relates to systems and methods of transferring digital content, storing digital content, and/or providing haptic feedback directly or indirectly responsive to an event such as the transfer of digital content via wearable devices, a communication, and/or other events. The wearable devices may each be associated with a location on a body of a user such that haptic feedback may be provided to particular locations on the body and/or digital content may be conceptually transferred to or from the particular locations. As used herein, "digital content" refers to information that can be transferred, streamed, and/or stored at a non-transitory storage medium. As such, digital content includes information encoded using various file formats and/or other content that can be transferred and stored at a non-transitory storage medium. As used herein, the term "worn," "wearable," and similar terms are intended to denote that a device may include conventional mechanical or other attachment components to be worn by the user and/or may be generally portable such that the device may be carried on the body of the user.

Figure 1:
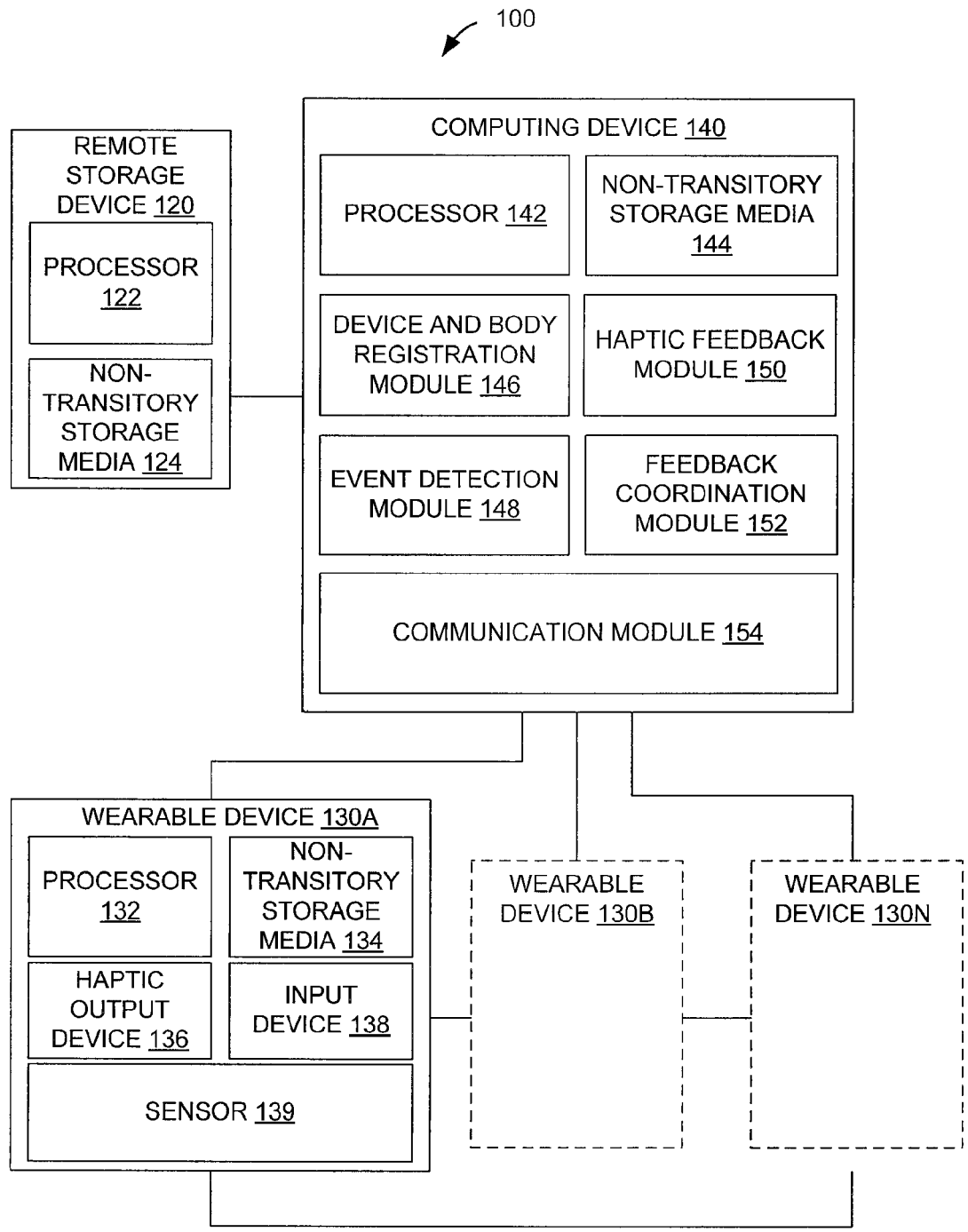
FIG. 1 illustrates a system for providing haptic feedback via wearable devices based on digital content transfer and/or initiating the digital content transfer via the wearable devices, according to an aspect of the invention.

FIG. 1 illustrates a system 100 for providing haptic feedback via wearable devices based on digital content transfers and/or initiating the digital content transfers via the wearable devices, according to an aspect of the invention. System 100 may include a remote storage device 120, a plurality of wearable devices 130 (illustrated in FIG. 1 as wearable device 130A, 130B, . . . , 130N), computing device 140, and/or other components.

Remote storage device 120 may include a processor 122, a non-transitory storage media 124, and/or other components. Remote storage device 120 may include "cloud" (e.g., networked) storage devices, local storage devices, and/or other types of devices that can receive and transfer digital content.

Wearable devices 130 may include generally portable devices that are configured such that they are worn on or otherwise carried by a user. In some implementations, wearable devices 130 may each include a processor 132, a non-transitory storage media 134, a haptic output device 136, an input device 138, a sensor 139, and/or other components. Some wearable devices 130 may act as dedicated haptic output devices, dedicated storage devices, dedicated input devices, dedicated sensor devices, or a combination device that includes one or more of the foregoing functions. For dedicated wearable devices, different types of wearable devices 130 may be collocated with other types of wearable devices 130. For example, a dedicated haptic output device and a dedicated storage device may be associated with the same location on the body of the user. Wearable devices 130 may include head-mounted devices such as glasses, computing device 140 (as described herein, computing device 140 may act as a wearable device 130 having the relevant components of wearable device 130 and vice versa), a smart watch, a device configured to be worn on the front of an apron or other apparel/wearable object, a pendant configured to be worn on the neck, and/or other types of wearable device.

Haptic output device 136 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers, or shape memory alloys, a macro-composite fiber actuator, an electro-static actuator, an electro-tactile actuator, and/or another type of actuator that provides a physical feedback such as a haptic (e.g., vibrotactile) feedback. Haptic output device 136 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as an ultrasonic feedback, a puff of air using an air jet, and so on.

Input device 138 may include a touchscreen, a camera, mechanical inputs, and/or other types of input components that a user may use to provide input to wearable device 130. Sensor 139 may include a three-dimensional ("3D") gyroscope, a 3D accelerometer, a 3D magnetometer, an image sensor (e.g., a charged coupled device ("CCD") or complementary metal-oxide semiconductor ("CMOS")) and/or other sensor devices.

In some implementations, computing device 140 may include one or more processors 142 programmed with one or more computer program modules, which may be stored in one or non-transitory storage media 144. Computing device 140 may be programmed by the one or more modules to provide haptic feedback via wearable devices 130 based on digital content transfers and/or initiating the digital content transfers via the wearable devices. The modules may include a device and body registration module 146, an event detection module 148, a haptic feedback module 150, a feedback coordination module 152, a communication module 154, and/or other modules.

In some implementations, device and body registration module 146 may be configured to receive registration information from a user and/or other source of registration information. The registration information may include device information, context information, and/or other information used for system functions.

The device information may include a device identifier (e.g., a media access control ("MAC") address and/or identifier that can identify the device), an indication of whether the device is to be worn, a location on the body at which the device is to be worn, a device capability (e.g., whether the device is capable of providing haptic feedback, storing digital content, receiving user inputs, etc.), communication information such as a network address (e.g., Uniform Resource Locator or other network address) or port information where communication channels may be established for transferring digital content, and/or other device information.

By registering the device information, computing device 140 may be made aware of the wearable devices 130 and other devices that can be used to transfer digital content and provide haptic feedback related to the transfer of digital content. For example, computing device 140 may determine locations on the body of the user at which various wearable devices 130 are to be worn, each of their respective capabilities (e.g., storage, haptic, input, etc.), and other devices to and/or from which digital content may be transferred. Furthermore, computing device 140, wearable device 130, and/or other device may act as a wearable device manager that manages or otherwise provides commands to various other wearable devices, which may be registered with the system. Examples of a wearable device manager is described in U.S. patent application Ser. No. 13/758,251, entitled "Wearable Device Manager," filed Feb. 4, 2013, which is incorporated by reference herein in its entirety.

In some implementations, device and body registration module 146 may be configured to map the devices identified by the device information such that the system associates each of the devices with a location in relation to the body and/or other devices. For example, device and body registration module 146 may generate a node map, where a given node is associated with a given device. Each node may be further associated with a location on the body. In this manner, device and body registration module 146 allows the system to understand the absolute position and/or relative location of devices with respect to one another. The node map may be used to generate "paths" through the nodes so that paths along the body may be generated throughout the body. This allows the system to provide, for example, haptic feedback that appears to move from one node (e.g., one body part) to another node (e.g., another body part), including any intervening nodes. The particular paths taken may be determined based on various conventional processing techniques such as nearest neighbor searching. Others forms of maps and map traversal may be used as well.

The context information may include an association of locations on the body of the user with different contexts of the events. For example, a "back pocket" location on the body may be associated with a particular type of communication, a particular sender or source of the communication, a particular event occurring within a user interface, an electronic wallet or purchase transaction context, and/or other context.

Different types of communications (e.g., a phone call, text message, and/or other type of communication) may each be associated with a given location on the body. For example, an incoming call may be associated with a first location on the body (e.g., a first device associated with the first location) and an incoming text message may be associated with a second location that is different from the first location. In this manner, when an incoming call is detected the first device may provide a first haptic feedback but when an incoming text message is detected, the second device may provide a second haptic feedback, which may be the same or different type of haptic feedback than the first haptic feedback. As such, the user may discern the type of incoming communication based on the location at which the haptic feedback is provided.

Likewise, even when the same type of communication is detected, different locations on the body may be associated with particular information related to the communication. For example, a sender of the communication may be associated with a first location while another sender may be associated with a second location. As such, the user may discern the sending or calling party of a communication based on the location at which the haptic feedback is provided. Similarly, different classes of users may be associated with different locations on the body. For instance, communications from work-related contacts may cause a first device at a first location to provide haptic feedback while communications from personal contacts may cause a second device at a second location to provide the haptic feedback. Other information from the communication (such as keywords, class of communication—e.g., whether likely junk mail, etc.) may be associated with different locations as well.

The system may be used in relation to purchase/payment events. For example, electronic wallet information such as a payment identifier may be included in the context information and associated with the back pocket location. In another example, a wrist location on the body may be associated with a contact exchange context. In the foregoing example, electronic contact exchange functions may be detected by the system and associated with the wrist location (and any devices associated with the wrist location). Other location-context associations may be registered as well, depending on the type of events that cause the haptic feedback.

Such context may be detected by an agent such as a mobile application operating on a controller device such as computing device 140. The agent in this example may be configured to detect incoming/outgoing communications, device status (e.g., whether a call is in progress, background/foreground applications, user interface interactions or events in an electronic environment, etc.), purchase transactions being conducted using computing device 140, contact exchanges using computing device 140, and/or other contextual processes that may be occurring in relation to computing device 140. The agent may be configured to operate on other devices such as wearable devices as well.

Regardless of the particular types of location-context associations that are made or how they are detected, the registration information facilitates detecting a context and providing haptic feedback to appropriate locations on the body and/or mediating transfer of digital content to appropriate locations on the body (e.g., wearable devices at those locations or remote devices associated with those locations) based on the context. It should be noted that the user may provide at least a portion of the registration information, thereby facilitating customizations of where haptic feedback should be provided on the user based on the detected events. Such customizations may be stored in a user profile.

In some implementations, the positions of wearable devices 130 may be manually input by a user on which the wearable devices 130 will be worn. In some implementations, the positions of wearable devices 130 may be automatically detected by a wearable device detecting the position of a neighboring wearable device and/or by a central controller (such as computing device 140) that detects the position of a given wearable device 130 with respect to another wearable device. Such automatic position determinations may be made based on a distance from one device to another. Wearable device 130 and/or computing device 140 may determine such distance based on signals with timestamps communicated from a given device to estimate its distance, signal strength indications of the signals, and/or other distance determining techniques.

In some implementations, event detection module 148 may be configured to receive information related to an event such as an incoming communication, an outgoing communication, interactions in an electronic environment (e.g., a user interface, gaming application, etc.), a sensed condition related to sensor information that describes a physical environment, which may include image information from which various events may be determined based on image processing, a transfer event, and/or other events to which the system may respond.

Information related to an incoming or outgoing communication may include an identity of a sender/recipient, a type of communication (e.g., phone call, electronic mail, etc.), and/or other information that describes the communication. Information related to an interaction in an electronic environment may include information that describes a user input at a user interface, a video game event, an interaction with or between one or more virtual or real objects, and/or other interactions in an electronic environment. The electronic environment can include a user interface environment, a video game environment, a virtual or augmented reality environment, and/or other environments that can be depicted or augmented electronically. Information related to a sensed condition in an environment such as a physical environment may include an ambient condition, a speed of an object moving in the environment, an orientation of the object, a position/location of the object, and/or other sensed condition related to the environment. The information related to the sensed condition may include image information from a camera, position/orientation information from a gyroscope, and/or other sensor information from one or more sensors 139 (which may be included within or otherwise associated with one or more wearable devices 130 and/or computing device 140).

In some implementations, wearable device 130 and/or computing device 140 may act as a smart assistant that can observe or otherwise sense the physical environment of the user to determine events occurring in the physical environment based on the information related to the sensed condition. Wearable device 130 and/or computing device 140 may then perform various tasks based on the determined events such as cause one or more haptic feedback to be output to provide a notification related to the event.

In some implementations, event detection module 148 may be used in conjunction with or as a smart assistant that detects events, performs tasks on behalf of the user based on the events, and provides notifications (e.g., haptic feedback) based on the events and/or tasks. For example, event detection module 148 may use sensor information to determine various events and respond to such events by performing tasks on behalf of the user. In a particular example, event detection module 148 may receive image information from a camera (e.g., an image sensor of the camera) and analyze the image information to detect specific events that may be relevant to the user, acting effectively as a second pair of eyes. The image information may include various spectra, including the visible spectrum, infrared spectrum, and/or other spectrum. The image information may include images from multiple sources such as multiple cameras placed at different angles/positions. Because of the automatic processing of the image information, image information in the non-visible spectra, and/or multiple image sources, event detection module 148 may detect events that may otherwise not be detected visually by the user. Such events can include, for example, rapidly moving events that would not otherwise be detected by the user, objects moving behind the user, temperature gradients (e.g., a hot handle), and/or other types of events that would otherwise not be detectable by the user.

Furthermore, event detection module 148 may alternatively or additionally use other sensor information such as motion, orientation, position, temperature, etc., to determine events occurring in the physical environment to provide enhance event detection, task automation, and/or notification of events such as via haptic feedback notification, visual notification, audio notification, and/or other notifications.

Attention will now be turned to particular examples of events that may be detected and examples of tasks that may be performed based on the detected events. In some implementations, event detection module 148 may perform one or more tasks such as searching for specific objects or persons in an image or environment (e.g., field of view), monitoring the environment for safety hazards, ensuring that a task is performed correctly by the user (e.g., following a recipe or assembly instructions), notifying the user as information is captured (e.g., names, lists, addresses, etc.) such that the user need not memorize the captured information, and/or perform other tasks.

In some embodiments, event detection module 148 may perform a visual search of the electronic or physical environment and provide a notification whenever an object or event of interest is within view. For example, event detection module 148 may detect that a friend, your keys, an item in a supermarket, a word being searched, information being searched such as directions to the washrooms or street signs, an event has occurred such as traffic lights turning green or otherwise changing an indicator, and/or other person or object of interest appears within the field of view or electronic image.

In some embodiments, event detection module 148 may provide safety warnings based on detected events. For example, event detection module 148 may warn that a person or object is approaching at a particular rate of speed (whether or not the object is within the user's field of view—e.g., approaching from behind or in front), an obstacle or danger such as car is incoming, a non-visible danger has been identified such as toxic fumes (based on chemical sensor information, for example) or a hot handle (based on temperature sensor information, for example), and/or other types of events that are classified as dangerous or otherwise requiring caution.

In some embodiments, event detection module 148 may keep track of compliance with requirements such as a recipe or assembly instructions. For example, event detection module 148 may ensure that the user follows a recipe properly, assembles objects such as furniture or toys properly, and/or follows other compliance requirements.

In some embodiments, event detection module 148 may perform information capture such as by processing images using conventional text or image processing techniques. For example, event detection module 148 may process name tags, price tags, maps, signs, and/or other information so that the user need not memorize the captured information.

In some embodiments, event detection module 148 may perform an automated action such as automatically turning off image/video recording functions when a washroom (e.g., detected via image processing of signs and/or other location indicia that indicate the washroom).

In some embodiments, event detection module 148 may perform task support functions such as by determining whether a person or object of interest leaves the user's field of view while recording, determining a status of a device such as the image stabilization capabilities of a camera have been exceeded, and/or other monitoring functions.

In some embodiments, event detection module 148 may perform privacy functions. The privacy functions may include warning the user when privacy may be compromised such as when a camera has been activated (e.g., a video recording is in progress as detected from an indicator from an image recording device), an upload of a video to a social network (which may have been inadvertently shared by the user or others), and/or other privacy functions.

In some embodiments, event detection module 148 may perform augmentation awareness such as an interactive object is visible within an electronic or physical environment, content such as an advertisement has been removed from the field of view, content such as a video has been added to a field of view, and/or other awareness functions.

Having described examples of detected events in the electronic and/or virtual environment and tasks, attention will now be turned to the haptic feedback that may be output based on the events and/or tasks. In some implementations, the haptic feedback may: notify the user whenever a certain condition has been met, such as the detection of an object, notify the user when an action has automatically been taken based on the visual field, direct the user's attention to specific locations within the visual field, and/or other types of notifications as described herein. The haptic feedback may include brief notifications or continuous feedback that changes with the system state (e.g., when different events are detected). The properties of the haptic feedback may communicate the type of event that has been detected and/or action that has been taken, the location at which this event has taken place, and/or the effective charge of the event, such as whether it is positive or negative. In some implementations, the haptic feedback may include vibrations, deformations, human-like actuation such as squeezing or poking, and/or other types of haptic feedback described herein, which may be output via one or more wearable devices 130, and/or computing device 140. The haptic feedback may provide relevant information without being disruptive to the user. For example, such haptic feedback may be private and non-disruptive. In other instances, the haptic feedback may be attention-grabbing in order to provide an alert to the user such as when a dangerous condition has been detected.

Information related to a transfer event may include a transfer of digital content that is about to occur (e.g., has been initiated), is occurring, or has occurred. The transfer event may be related to different processes. For example, the processes may include copying/downloading/uploading digital content such as photographs, conveying transaction information (e.g., financial information, pricing information, receipts, etc.) for purchases, exchanging contact information between devices, and/or other types of processes.

The digital transfer may occur between various devices such as between wearable devices 130 (e.g., transfer digital content from a first wearable device 130 to a second wearable device 130), from a wearable device 130 to computing device 140 (and vice versa), from a wearable device 130 to remote storage device 120 (and vice versa), and/or other transfers, including transfers from one device to multiple devices or multiple devices to one device.

In some implementations, event detection module 148 may detect a user input via input device 138. The user input may include a gesture, a touch, and/or other user manipulation of input device 138. The user input may be associated with one or more commands. For example, a command may include a command to initiate a transfer of digital content from a wearable device 130, accept an incoming transfer of digital content to the wearable device, request a status of a transfer, and/or other command input.

In some implementations, event detection module 148 may identify a context for the transfer event. For example, event detection module 148 may obtain a signal from a device (such as wearable device 130 and/or other device) that indicates a context for a process occurring in relation to the device. Such signals may be received via wired or wireless communication protocols that are established between computing device 140 and the device. In the context of a purchase transaction, for example, event detection module 148 may receive an indication from a point of sale device, electronic wallet device, and/or other device that indicates that a purchase has been, is about to be, or is currently being transacted.

In some implementations, the point of sale device and/or other device may be configured to provide an initial haptic feedback when transferring digital content (such as a receipt) such that the haptic feedback "moves" from the point of sale device through the body of the user to the destination. Likewise, the point of sale device and/or other device may be configured to provide a terminating haptic feedback when receiving digital content (such as payment/account information) such that the haptic feedback moves from and through the body of the user to the point of sale device.

In some implementations, computing device 140 may be configured by a digital wallet agent/application module (not illustrated in FIG. 1) that facilitates electronic payments. In these implementations, the signal that indicates the context may originate from computing device 140.

Other types of contexts and application modules may be indicated as well. For example, in the context of contact sharing, users may be shaking hands with or otherwise indicating that contact information should be shared between one another. Each user may operate a computing device 140 or other device that provides an indication that contact information is being shared. In these implementations, event detection module 148 may determine the contact sharing context.

In some implementations, event detection module 148 may determine a transfer status such as, for example, that the transfer is initiated but has not yet started, is in progress, is complete, has failed, and/or other status of the transfer. In some implementations, event detection module 148 may determine whether the digital content to be transferred is compatible with the device to which the digital content is being transferred. For example, event detection module 148 may consult a database of device types and supported file types (not illustrated in FIG. 1) to determine whether a given device is compatible with the digital content.

In some implementations, event detection module 148 may determine a property of the digital content. For example, the property may include a size, a type, a length, and/or other property of the digital content being transferred.

In some implementations, event detection module 148 may be configured to interrupt the transfer of digital content. Event detection module 148 may cause the interruption based on receipt a user input. For example, a user may initiate the interruption by providing a gesture or other input at a wearable device 130. The interruption may include a cancellation of the transfer, a redirection of the transfer (e.g., change the destination and/or source of the digital content related to the transfer), and/or otherwise alter the transfer of digital content from the original source to the original destination. Such interruptions may be applied in various contexts.

In some implementations, for example, responsive to a detection of a purchase transaction occurring in association with a user wearing wearable devices 130, the system may provide the user with haptic feedback that simulates a funds transfer flowing from the back pocket location, up a torso location and then down an arm location towards a "buy" button that the user is pressing on a touchscreen. The user may have intended to check shipping costs instead of initiating the purchase. Realizing the error (based on the haptic feedback), the user may interrupt the transfer by providing an input at a wearable device 130 located at the arm (for example), thereby intercepting the haptic feedback at the arm, which may cancel the transfer. In some implementations, the user may make a gesture (or other input) to redirect the transfer back towards the back pocket to thereby cancel the transfer. The transfer of digital content (in the foregoing example, the transfer of electronic funds) may therefore be interrupted and cancelled.

In other examples, the user may redirect the flow of data to a different location such that the transfer is not cancelled but rather altered. For example, a credit card payment may be associated with a back pocket location while a payment service such as PAYPAL may be associated with a front pocket location. Upon selection of an errant payment method (e.g., credit card), the user may interrupt the funds transfer and redirect the payment to the intended payment method (e.g., PAYPAL) based on one or more input gestures at a wearable device 130.

In yet another example, the user may be transferring digital content to a storage (e.g., external storage) associated with a wearable device 130 that is associated with a leg. The user may cause the transfer of digital content to be intercepted and flicked upwards, dragged to, or otherwise have an input that causes the digital content to be stored instead (or in addition) to a storage device (e.g. local storage) associated with a wearable device 130 located at an arm.

Whichever examples and/or context in which the interruption takes place, the system may obtain user input and interrupt the transfer of digital content based on the user input. In some implementations, the system may provide haptic feedback such as an impact effect when a data flow is intercepted to give the user confirmation of the interrupted status.

Using the interrupt feature, the user is able to verify the transfer of digital content and correct (if necessary) or otherwise alter the source and/or the destination of the digital content being transferred.

In some implementations, haptic feedback module 150 may be configured to generate one or more control signals to be provided based on haptic feedback triggers. A control signal causes haptic output device 136 to output haptic feedback, which may vary depending on the control signal. The haptic feedback triggers may include information from event detection module 148 and/or other triggers that cause haptic feedback to be output. For example, haptic feedback may be provided to the user based on the transfer event, context of the transfer event, the transfer status, the properties of the digital content, and/or other information related to a transfer event.

Each of the haptic feedback triggers may be associated with individual haptic feedback. For example, as a transfer progresses from initiation to completion, individual haptic feedback may be provided to distinctly indicate each status.

In some implementations, haptic feedback module 150 may vary the haptic feedback for different types of haptic feedback triggers. The haptic feedback may be varied by altering one or more characteristics of haptic feedback such as the magnitude, the frequency, the number (e.g., number of pulses or other haptic feedback), duration, and/or other characteristic of haptic feedback.

Haptic feedback module 150 may vary haptic feedback to be output based on properties of the digital content being transferred. For example, haptic feedback module 150 may vary the haptic feedback based on the size, length, etc., of the digital content, whether the digital content is compatible with the device to which the digital content is being transferred, and/or other property of the digital content. In a particular example, a larger file being transferred may be associated with longer or otherwise different haptic feedback than for a smaller file being transferred.

Haptic feedback module 150 may likewise vary the haptic feedback based on other different types of haptic feedback triggers. For example, haptic feedback that indicates transfers in progress may be different than haptic feedback that indicates completed transfers, which may be different than haptic feedback that indicates failed transfers. Haptic feedback may be varied based on other differences such as differences in context (e.g., different haptic feedback for a purchase context than for a contact exchange context) and/or other differences in the transfer of digital content.

In some implementations, feedback coordination module 152 may be configured to identify one or more wearable devices 130 that are to receive the control signals to cause haptic feedback. In other words, feedback coordination module 152 may determine one or more locations on the body that should receive the haptic feedback.

Feedback coordination module 152 may identify wearable devices 130 based on the context. For example, in a communication context, feedback coordination module 152 may identify a particular wearable device 130 or other device that is associated with a location at which haptic feedback should be provided. Feedback coordination module 152 may consult with a user profile to determine user preferences related to where haptic feedback should be provided. For example, feedback coordination module 152 may cause haptic feedback to be provided at a smart watch for incoming phone calls and cause haptic feedback to be provided at a wearable wrist band mobile communication device (e.g., a "smartphone") for incoming text messages, which may be based on the user profiled.

In a user interface context, feedback coordination module 152 may cause haptic feedback to be provided at a particular wearable device to confirm a button press associated with an electronic environment and cause a haptic feedback to be provided at another wearable device to confirm a hover over an icon. In this manner, different user interface events may be distinguished by the user based on a location on a body or of the user or other location at which the haptic feedback confirmation is provided. In a gaming context, feedback coordination module 152 may cause haptic feedback to be provided at a first wearable device based on an explosion occurring in the game and cause haptic feedback to be provided at a second wearable device based on a power up being acquired. Thus different gaming events may be distinguished by the user based on the location where the haptic feedback is provided.

Likewise, in a sensor-based context, different haptic feedback may be provided to different devices based on the sensor information. For example, certain body parts may be associated with more severe sensor conditions (e.g., higher temperature) while other body parts may be associated with less severe sensor conditions.

In a purchase context, feedback coordination module 152 may identify a particular wearable device 130 that is associated with the "back pocket" location and/or associated with a purchase transaction based on the registration information obtained by device and body registration module 146. Feedback coordination module 152 may then cause the control signal to be transmitted to the identified wearable device.

In some implementations, feedback coordination module 152 may provide haptic feedback along a "path" on the body by identifying wearable devices 130 along the path that can provide the haptic feedback. Such path may include a linear path such that one or more successive wearable devices 130 are serially caused to provide haptic feedback to give the impression of movement along the path. For example, wearable devices 130 may be serially provided with respective control signals or may be simultaneously provided with respective control signals with appropriate timing mechanisms such that haptic feedback is not necessarily output immediately upon receipt of the control signal by a given wearable device.

In some implementations, the path is not necessarily linear or serial. For example, the path may take the form of various shapes and configurations involving wearable devices 130. Furthermore, different activation patterns instead of a serial activation pattern may be used as well.

To identify the devices along the path, feedback coordination module 152 may consult a node map that represents individual wearable devices as a node on the node map generated by device and body registration module 146. In this manner, feedback coordination module 152 may generate various paths on the body based on conventional node traversal techniques, including node mapping techniques, among others.

For example, for purchase transactions, feedback coordination module 152 may generate and establish a path from the "back pocket" location to an "arm location" along with any intervening wearable devices 130 based on the node map. An intervening wearable device may include one or more devices that are physically between—either in an absolute or relative sense—a wearable device and another wearable device. In this manner, feedback coordination module 152 may provide haptic feedback that appears to move from the user's back pocket to the user's arm via a path of wearable devices 130 to virtually indicate that currency is being transferred from the user to a merchant (e.g., from a digital wallet to a device that accepts digital wallet payments). Likewise, feedback coordination module 152 may provide haptic feedback that appears to move from the user's arm to the user's pocket (e.g., in the reverse path) to indicate a digital receipt being transferred from the merchant to the wearable device 130 associated with the back pocket.

In some implementations, feedback coordination module 152 may be configured to coordinate the progression of haptic feedback that is output at two or more wearable devices 130 or other devices that are configured to provide haptic feedback. For example, feedback coordination module 152 may progressively increase an intensity of haptic feedback at one device and progressively decrease an intensity of haptic feedback at a second device to reinforce the impression of content flow between the two devices. Such coordination may be applied to more than two devices as well.

In some implementations, feedback coordination module 152 may identify a wearable or other device that is to provide the haptic feedback based on projected haptic feedback such as ultrasonic feedback, a puff of air using an air jet, and/or other projected haptic feedback. For example, a given haptic output device 136 may project haptic feedback to a target location that is different than a point of contact between the haptic output device 136 and the user. In these instances, feedback coordination module 152 may identify the target location at which the haptic feedback is to be provided and identify a corresponding device that includes the haptic output device 136 that projects haptic feedback at the target location.

In some implementations, communication module 154 may be configured to facilitate communication between computing device 140 and wearable device 130. The established communication may include various wireless and/or wired communications as described herein. In some implementations, communication module 154 may configure computing device 140 as a centralized controller of wearable devices 130. In some implementations, communication module 154 may configure computing device 140 as a peer that communicates with wearable devices 130. In some implementations, communication module 154 may configure computing device 140 as a hybrid centralized controller and peer, where computing device 140 can act as a centralized controller at some times (and/or with some wearable devices 130) and as a peer at other times (and/or with other wearable devices 130).

Although not illustrated in FIG. 1 for convenience, in some implementations, computing device 140 may include a haptic output device and an input device as described with respect to wearable device 130. As such, in some implementations, at least some or all of the functions described above with respect to wearable device 130 may be performed at computing device 140. In other words, computing device 140 when configured as a portable device may additionally be configured to function as another wearable device 130. Likewise, wearable device 130 may include at least one of the modules described with respect to computing device 140 and may therefore perform at least some of the functions of computing device 140.

In some implementations, computing device 140 may include a plurality of haptic output devices (not illustrated in FIG. 1) whose positions are known relative to other components of computing device 140. For example, the positions of the plurality of haptic output devices may be known with respect to a display device such that directional haptic feedback may be provided to indicate a path from a source depicted in the display device (e.g., a folder icon or other depiction) to a destination depicted in the display device (e.g., another folder icon or other depiction).

In some implementations, computing device 140 may be configured as part of other user contact points such as furniture, a seat in a vehicle, and/or other user contact point. Directional haptic feedback may be similarly provided as described herein based on a mapping of haptic output devices of the contact point.

Non-transitory storage media 144 and other storage media described herein may include one or both of system storage that is provided integrally (i.e., substantially non-removable) with computing device 140 and/or removable storage that is removably connectable to computing device 140 via, for example, a port (e.g., a USB port, a firewire port, etc.) or a drive (e.g., a disk drive, etc.). Non-transitory storage media 144 and other storage media described herein may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Non-transitory storage media 144 and other storage media described herein may include one or more virtual storage resources (e.g., cloud storage, a virtual private network, and/or other virtual storage resources). Non-transitory storage media 144 and other storage media described herein may store software algorithms, information determined by processor(s) 142, information received from computing device 140, and/or other information that enables computing device 140 to function as described herein.

Processor(s) 142 and other processors described herein are configured to provide information processing capabilities in computing device 140. As such, processor(s) 142 and other processors described herein may include one or more of a digital processor, an analog processor, a digital circuit designed to process information, an analog circuit designed to process information, a state machine, and/or other mechanisms for electronically processing information. Although processor(s) 142 and other processors described herein is illustrated in FIG. 1 as a single entity, this is for illustrative purposes only. In some implementations, processor(s) 142 and other processors described herein may include a plurality of processing units. These processing units may be physically located within the same device, or processor(s) 142 and other processors described herein may represent processing functionality of a plurality of devices operating in coordination. Processor(s) 142 and other processors described herein may be configured to execute modules by software; hardware; firmware; some combination of software, hardware, and/or firmware; and/or other mechanisms for configuring processing capabilities on processor(s) 142 and other processors described herein.

The various modules described herein are exemplary only. Other configurations and numbers of modules may be used, as well using non-modular approaches so long as the one or more physical processors are programmed to perform the functions described herein. It should be appreciated that although the various modules are illustrated in FIG. 1 as being co-located within a single processing unit, in implementations in which processor(s) 142 includes multiple processing units, one or more modules may be located remotely from the other modules. The description of the functionality provided by the different modules described herein is for illustrative purposes, and is not intended to be limiting, as any of modules may provide more or less functionality than is described. For example, one or more of the modules may be eliminated, and some or all of its functionality may be provided by other ones of the modules. As another example, processor(s) 142 may be configured to execute one or more additional modules that may perform some or all of the functionality attributed herein to one of the modules.

The components illustrated in FIG. 1 may be communicably coupled to one another via various communication links such as a network. The network may include wired or wireless connections. In some aspects of the invention, the network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Various inputs, outputs, configurations, and/or other information described herein as being stored or storable may be stored in one or more databases (not illustrated in FIG. 1). Such databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2A:
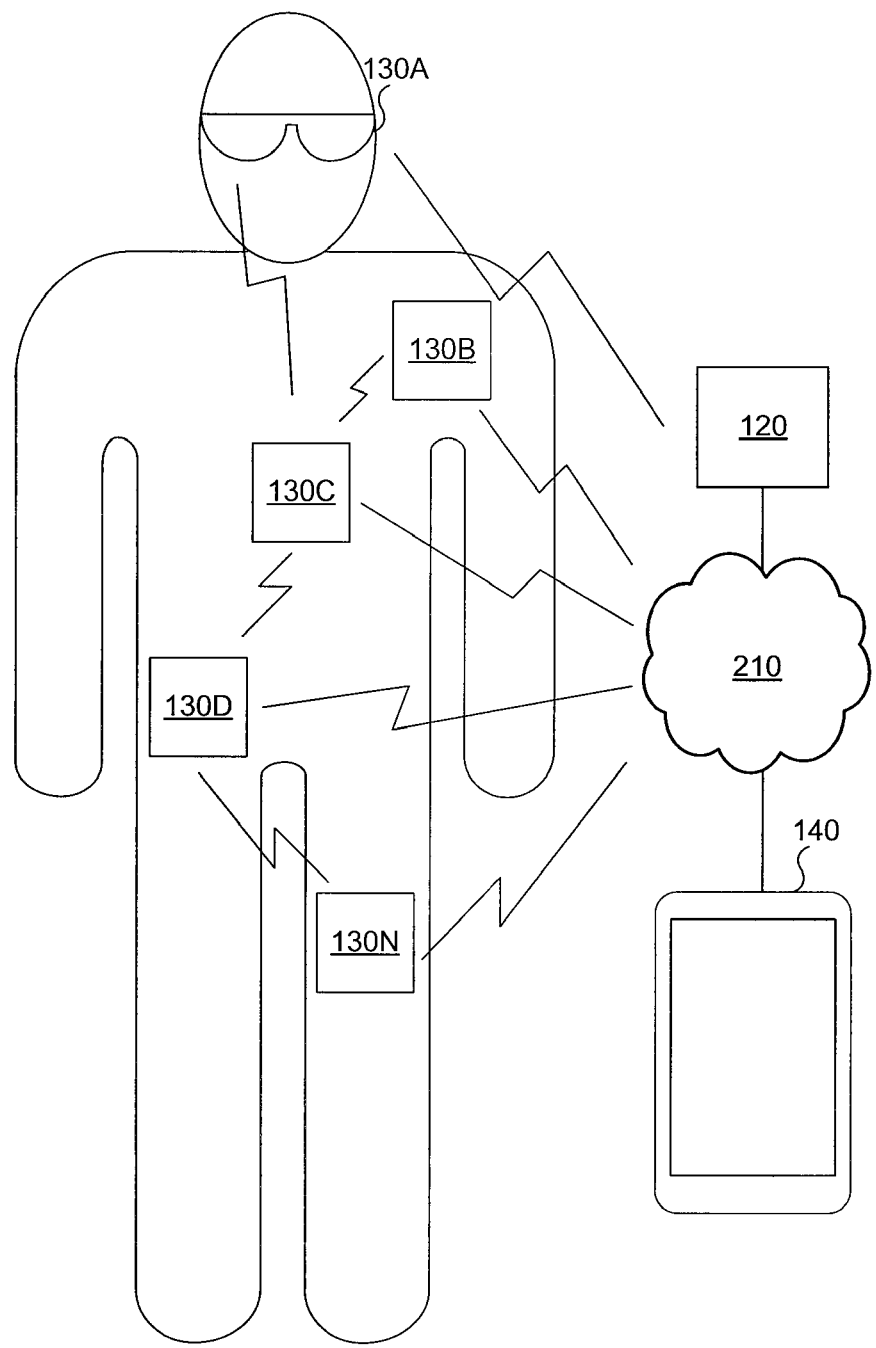
FIG. 2A illustrates wearable devices on a user of a system for providing haptic feedback via wearable devices based on digital content transfer and/or initiating the digital content transfer via the wearable devices, according to an aspect of the invention.

FIG. 2A illustrates wearable devices 130 (illustrated in FIG. 2A as wearable devices 130A, 130B, . . . , 130N) on a user of a system for providing haptic feedback via the wearable devices based on digital content transfer and/or initiating the digital content transfer via the wearable devices, according to an aspect of the invention. Wearable devices 130 may be communicably coupled to one another and/or other devices (such as computing device 140 and remote storage device 120) via a network 210. Network 210 may include various wireless and/or wired communication links described herein.

Figure 2B:
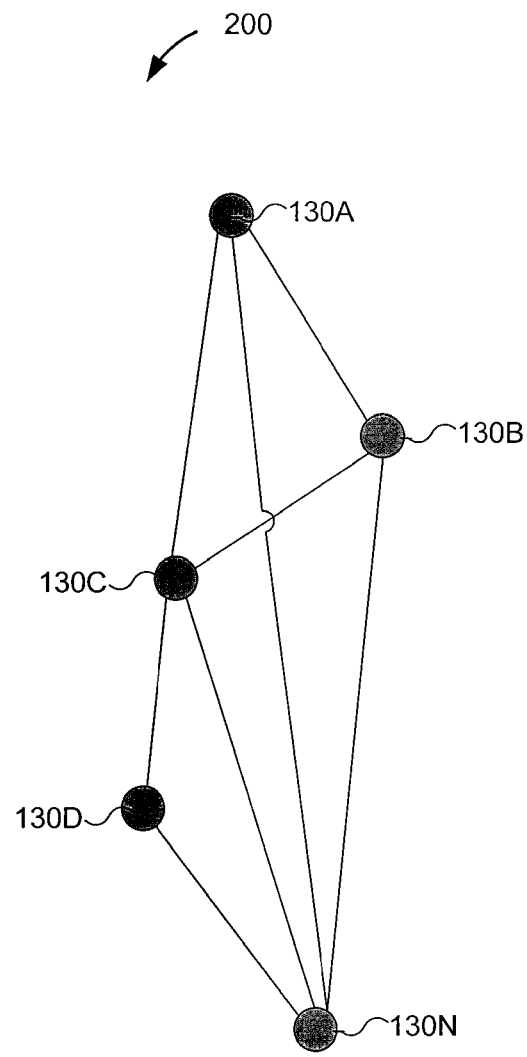
FIG. 2B illustrates a node map of wearable devices represented as nodes corresponding to locations on a user of a system for providing haptic feedback via wearable devices based on digital content transfer and/or initiating the digital content transfer via the wearable devices, according to an aspect of the invention.

FIG. 2B illustrates a node map 200 of wearable devices 130 (illustrated in FIG. 2B as wearable devices 130A, 130B, . . . , 130N) represented as nodes corresponding to locations on a user of a system for providing haptic feedback via wearable devices based on digital content transfer and/or initiating the digital content transfer via the wearable devices, according to an aspect of the invention.

Referring to both FIGS. 2A and 2B, in some implementations, a given wearable device 130 may be connected to every other wearable device. Likewise, a given wearable device 130 may be connected to every other device associated with the wearable devices such as computing device 140 and remote storage device 130. In other implementations, a given wearable device 130 may be connected only to a subset of other wearable devices. Likewise, a given wearable device 130 may be connected to only a subset (or no) other devices associated with the wearable devices.

Each wearable device 130 and corresponding node representation may be associated with a location on a body of the user. For example, wearable device 130A and its corresponding node on node map 200 may be associated with a head of the user, wearable device 130B and its corresponding node may be associated with a shoulder of the user, and other wearable devices 130 and their corresponding nodes may be associated with other locations on the body of the user. Other numbers of wearable devices 130 may be used as well.

In some implementations, haptic feedback may be provided through a plurality of wearable devices 130. In some implementations, two or more wearable devices 130 may be caused to simultaneously provide haptic feedback via respective haptic output devices. In some implementations, haptic feedback may be provided along a path through the body wearable devices 130, where one or more wearable devices 130 are caused to provide haptic feedback along the path. Such haptic feedback along the path may be sequential such at a given time one or more wearable devices 130 along the path provide haptic feedback serially. In the foregoing example, the haptic feedback may provide a feeling of movement along the body of the user. In other examples, the haptic feedback along the path may be provided such that the path forms a particular pattern or configuration where haptic feedback is simultaneously provided along two or more points (nodes) along the path.

The path may be determined based on node map 200. For example, the feedback coordination module 152 illustrated in FIG. 1 may be configured to consult node map 200 to determine the path along which haptic feedback should be provided.

In purchase contexts, for example, a path that starts at wearable device 130D and ends at wearable device 130B may be determined based on a position of their corresponding nodes on node map 200. The path may include a direct path (not illustrated in FIG. 2B) such that the path includes only nodes corresponding to wearable devices 130D and 130B. The path may include intervening wearable devices 130 such that haptic feedback is provided that appears to travel from wearable device 130D through the body to wearable device 130B. The path with intervening wearable devices 130 may additionally include wearable device 130C or may include other wearable devices 130 as well (such as wearable device 130A). The path and node determinations may be applied to other contexts described herein, such as a communication context. For example, in communication contexts, a path that starts at a mobile communication device (e.g., a device 140) and end at a wearable device 130C may be determined based on the corresponding nodes on node map 200.

Different paths that involve different numbers and configurations of wearable devices 130 may be used depending on the context and/or type of the transfer of digital content.

In some implementations, the paths may be configured by the user to facilitate custom haptic feedback and/or may be preconfigured by, for example, developers of the system/wearable devices.

In some implementations, each wearable device 130 may act as a peer such that an individual wearable device 130 determines whether to provide haptic feedback based on information received by all wearable devices 130.

In some implementations, a wearable device 130 may serve as a master device that commands and controls other wearable devices 130. In these implementations, the master device may be configured with one or more modules illustrated in FIG. 1 such that the master device determines which wearable device(s) 130 (and/or other device such as a smartphone, which as described herein may also function as a wearable device 130) should provide haptic feedback. In a particular implementation, wearable device 130A configured as a head-mountable device may be configured to identify one or more wearable devices 130, computing device 140, device 120, and/or other device that should provide haptic feedback. In these implementations, the head-mountable device may identify one or more devices that should provide haptic feedback based on the information related to the event and/or context of the event. In some of these implementations, the head-mountable device may not include a haptic output device that provides haptic feedback since such feedback to a head of the user wearing the device may be undesirable, as well as weight, size, cost, and/or other constraints that may make placing haptic output devices on the head-mountable device difficult or impractical. As such, the head-mountable device may not itself provide haptic feedback but instead command other devices such as wearable devices 130 to provide haptic feedback. In other implementations, the head-mountable device may include haptic output devices, as with other wearable device 130 described herein.

In some implementations, the head-mountable device may communicate with computing device 140 and receive information related to events from computing device 140. Responsive to the received information, the head-mountable device may identify the one or more devices that should provide the haptic feedback. In some implementations, the head-mountable device may receive information related to events based on user interactions with and/or within an electronic environment associated with the head-mountable device. For example, the head-mountable device may provide a graphical user interface with which the user may interact. The information related to the events may be based on inputs or other interactions with the graphical user interface such that the head-mountable device receives such information from various input devices associated with the head-mountable device. For example, the head-mountable device may receive an input (e.g., via an integrated touch input device, button, camera, etc.). Responsive to the input, the head-mountable device may cause a haptic feedback to be provided at one or more locations that is associated with a haptically-enabled device such as a wearable device 130 or computing device 140.

In some implementations, the head-mountable device may directly transmit to an identified wearable device 130 or other device control signals that cause the wearable device 130 to output haptic feedback. In other implementations, another device such as computing device 140 transmits the control signals to the identified device. In these implementations, the head-mountable device may communicate a request to the computing device 140 to cause a haptic feedback at a given location. Responsive to the request, computing device 140 may identify one or more devices associated with the given location and transmit the control signal to the identified one or more devices.

Figure 3:
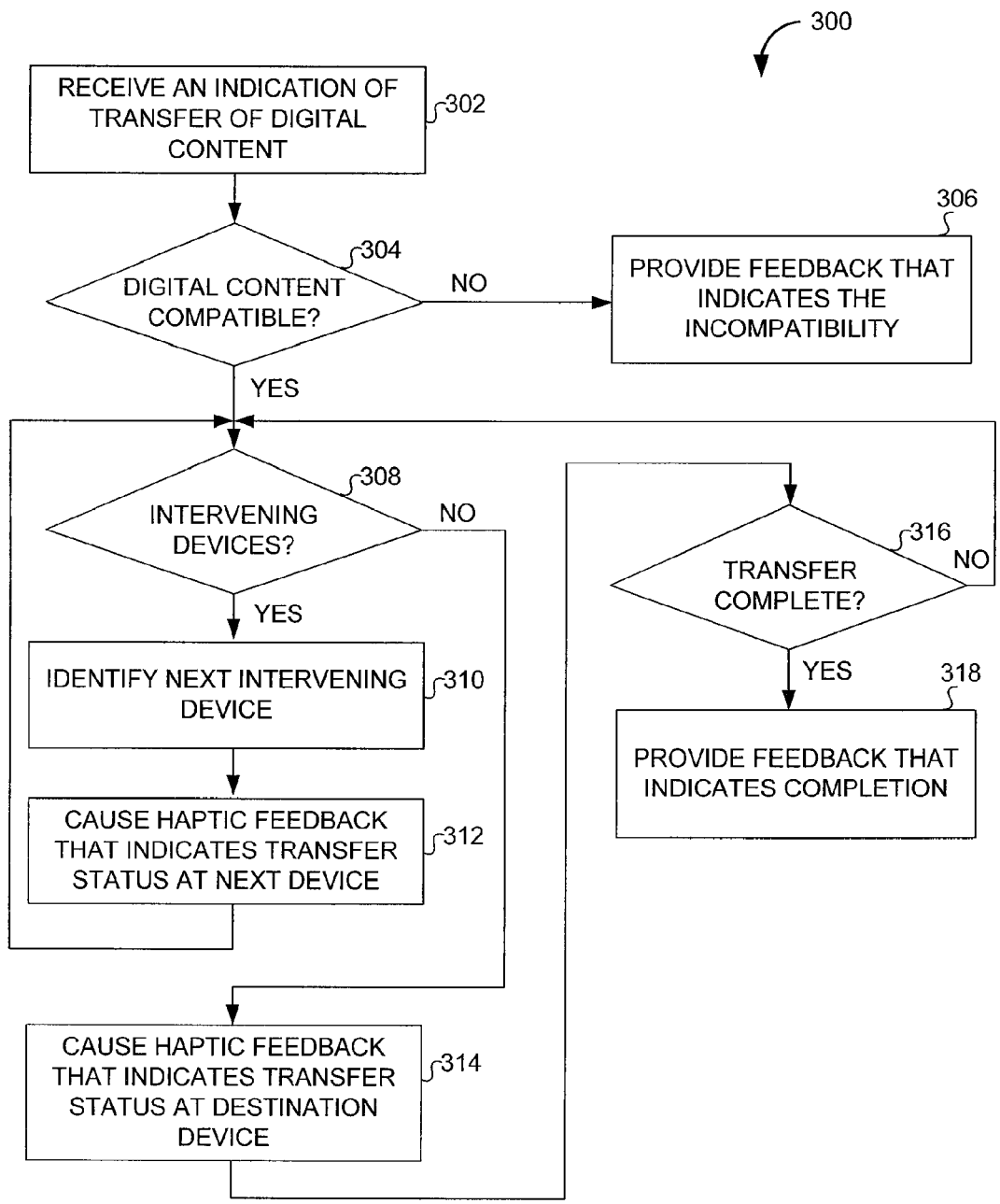
FIG. 3 illustrates an example of a process for providing haptic feedback via wearable devices based on digital content transfer and/or initiating the digital content transfer via the wearable devices, according to an aspect of the invention.

FIG. 3 illustrates an example of a process for providing haptic feedback via wearable devices based on digital content transfer and/or initiating the digital content transfer via the wearable devices, according to an aspect of the invention. The various processing operations depicted in the flowchart of FIG. 3 and other Figures are described in greater detail herein. The described operations may be accomplished using some or all of the system components described in detail above. According to an aspect of the invention, various operations may be performed in different sequences. In other implementations, additional operations may be performed along with some or all of the operations shown in FIG. 3 and other Figures, or some operations may be omitted. In yet other implementations, one or more operations may be performed simultaneously. Accordingly, the operations as illustrated (and described in greater detail below) are exemplary in nature and, as such, should not be viewed as limiting.

In an operation 302, an indication of the transfer of digital content may be received. The transfer may be related to a download/upload of digital content such as a photograph or other content, an electronic purchase transaction, and/or other event that is associated with digital content transfer. The indication may be received at a computing device that controls wearable devices and/or may be received at one or more of the wearable devices. The digital content may be transferred from a source device to a destination device. The source device may include a wearable device (or a remote device that stores digital content and is associated with a wearable device) or other device. The destination device may also include a wearable device (or remote device that is associated with the wearable device) or other device. In some instances, both the source device and the destination device may include wearable devices (or remote devices associated with the wearable devices).

In an operation 304, a determination of whether the digital content is compatible with the destination device may be determined. For example, a determination of whether a particular media or document file can be rendered at the destination device may be made. Such determination may be made based on, for example, a registry that includes an association of destination devices known by the system and corresponding compatible formats/documents. If the digital content is incompatible with the destination device, feedback such as haptic feedback (and/or other feedback) may be provided to indicate the incompatibility in an operation 306. On the other hand, if the digital content is compatible with the destination device, a determination of whether there exists one or more intervening devices between the source device and the destination device may be made in an operation 308. Such determination may be based on a node map that maps the location of the wearable devices with respect to one another and/or with respect locations on the body of a user.

If one or more intervening devices exist, the next intervening device may be identified in an operation 310 and haptic feedback that indicates the transfer may be caused at the next intervening device in an operation 312. Process 300 may return to operation 308.

If one or more intervening devices do not exist, haptic feedback that indicates the transfer may be caused at the destination device (which may be a wearable device or a remote device) at an operation 314.

In an operation 316, a determination of whether the transfer is complete may be made. If the transfer is complete, a haptic feedback may be caused to be provided that indicates the completion in an operation 318. The haptic feedback may be provided at the source device, destination device, one or more intervening devices, and/or other devices in communication with any of the foregoing devices.

Returning to operation 316, if the transfer is not yet complete, processing may return to operation 308 and the intervening devices and/or destination device is identified for re-iterating haptic feedback based on the status of the transfer. In some implementations, although not illustrated in FIG. 3, haptic feedback may be caused to be provided at the source device as well.

Figure 4:
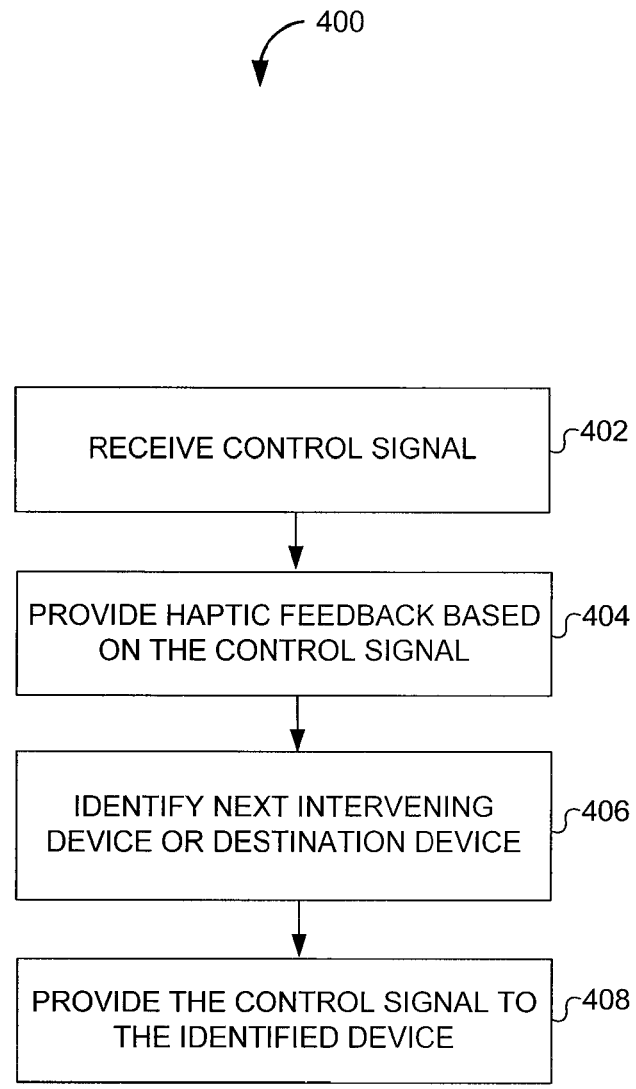
FIG. 4 illustrates an example of a process for providing haptic feedback among wearable devices in communication with one another, according to an aspect of the invention.

FIG. 4 illustrates an example of a process 400 for providing haptic feedback among wearable devices in communication with one another, according to an aspect of the invention. For example, wearable devices may be connected to one another in a daisy-chain or other sequential configuration. Information describing the configuration may be provided by the user such as during the registration process described herein and/or may be preconfigured as a system.

In an operation 402, a control signal may be received. The control signal may be received at a wearable device from another wearable device or other device (e.g., computing device 140 illustrated in FIG. 1). In an operation 404, haptic feedback may be provided based on the received control signal. For example, the control signal may include one or more signals that when applied to a haptic output device causes the haptic feedback. In other examples, the one or more signals may include a lookup identifier that is associated with predefined haptic feedback to be provided.

In an operation 406, the next device along the sequence may be identified. For example, each wearable device may be configured with a device identifier for the previous and/or next device along a patch. In an operation 408, the control signal or other control signal that causes the next haptic feedback may be provided to the identified next device.

Figure 5:
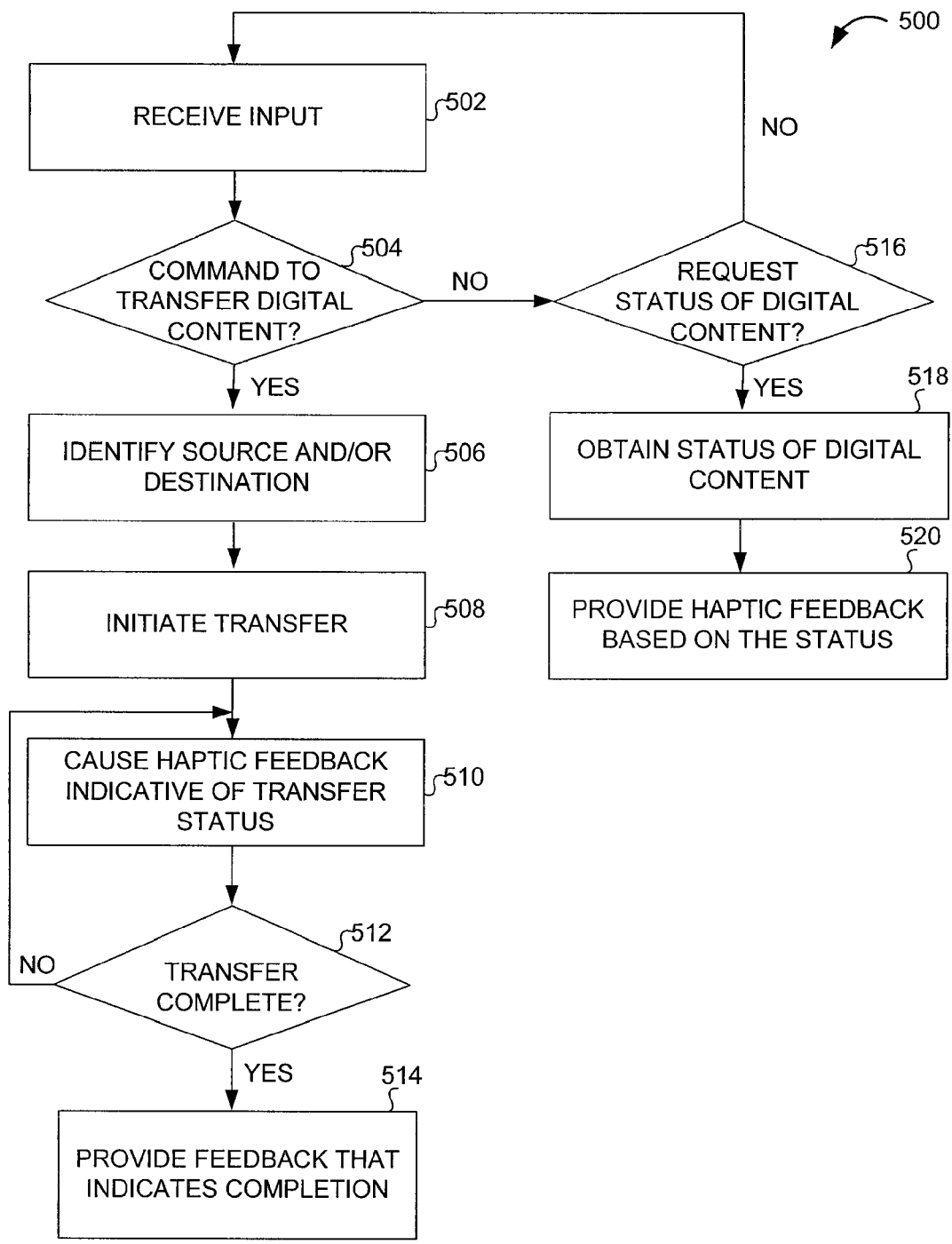
FIG. 5 illustrates an example of a process for responding to user inputs made at a wearable device in relation to a transfer of digital content, according to an aspect of the invention.

FIG. 5 illustrates an example of a process 500 for responding to user inputs made at a wearable device in relation to a transfer of digital content, according to an aspect of the invention.

In an operation 502, an input may be received via an input device. For example, a user may provide a touch or other input at a wearable device that is worn by the user. In an operation 504, a determination of whether the input relates to a command to initiate a transfer of digital content may be made. If the input is related to the command, a source and/or destination of the transfer is identified in an operation 506. Furthermore, the digital content itself may be identified based on the input and/or additional inputs from the user. In an operation 508, the transfer may be initiated. In an operation 510, haptic feedback indicative of the status of the transfer may be provided.

In an operation 512, a determination of whether the transfer is complete may be made. If the transfer is not complete, process 500 may return to operation 510. In some implementations, process 500 may wait a predetermined amount of time before proceeding after the determination at operation 512. If the transfer is complete, haptic feedback that indicates the completion may be provided in an operation 514.

Returning to operation 504, if the input does not relate to the command to transfer digital content, a determination of whether the input relates to a request for the status of digital content may be made in an operation 516. For example, the user may request whether a file related to the transfer is available at a wearable device and may provide an input at the wearable device to obtain the status. If the input is not related to the request for the status, process 500 may listen for inputs. If the input is related to the request, a status of the digital content may be obtained in an operation 518. For example, the status may indicate that the digital content is stored at the wearable device at which the input is received (or other associated device). In an operation 520, haptic feedback based on the determined status may be provided. Different haptic feedback may be provided based on different status. For example, a particular haptic feedback may be provided when the digital content is stored while a different type of haptic feedback may be provided when the digital content is not stored (e.g., is still in progress or the transfer is still in progress).

Figure 6:
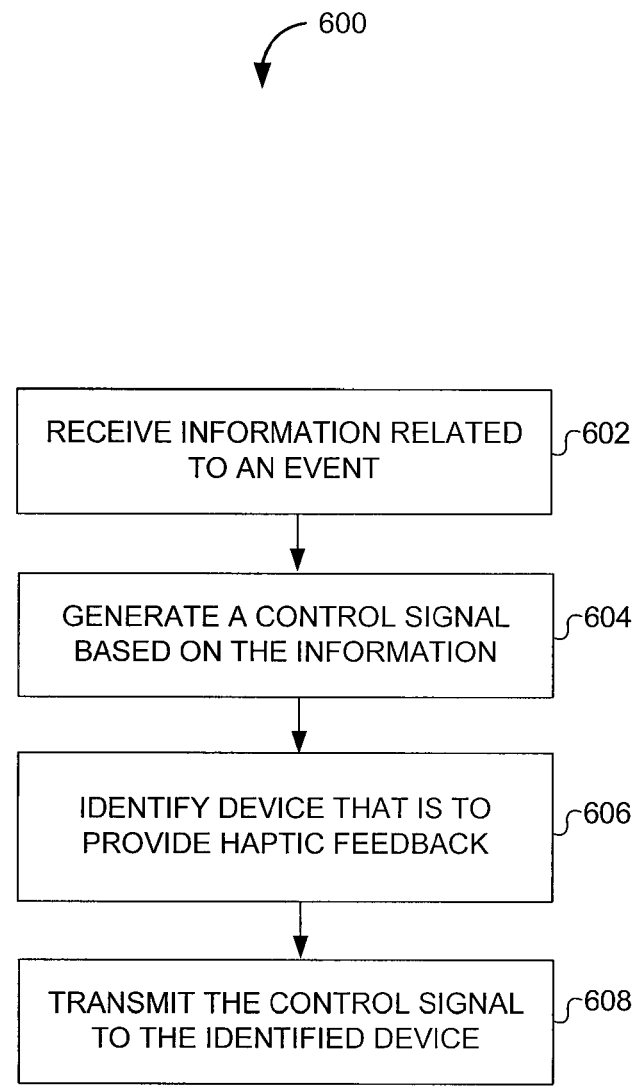
FIG. 6 illustrates an example of a process for providing haptic feedback to different locations on a body of a user based on events, according to an aspect of the invention.

FIG. 6 illustrates an example of a process 600 for providing haptic feedback to different locations on a body of a user based on events, according to an aspect of the invention. In an operation 602, information related to an event may be received. The information related to the event may include information that indicates a type of the event, a context of the event, and/or other information that describes the event. For example, the type of event may include a communication, an interaction in an electronic environment, a sensor event that is based on a sensed condition, a transfer of digital content, and/or other event. The context of the event may indicate information for a given type of event.

In an operation 604, a control signal may be generated based on the event. The control signal may be configured to cause a haptic feedback. In an operation 606, a device that is to receive the control signal may be identified. For example, the device may be selected from among a plurality of wearable or other haptically-enabled devices that are configured to provide haptic feedback. At least some of the haptically-enabled devices may be associated with a location on a body of the user at which the haptic feedback is provided. For example, a wearable device may be associated with a location on the body at which the user wears the wearable device. A remote device separate from the user (e.g., not worn by the user) may be associated with a location at which the remote device is intended to provide haptic feedback. For example, if the remote device includes a touch pad that the user typically touches to provide input, the remote device may be associated with a fingertip or hand location. Such device and body location associations facilitate the provision of haptic feedback to a location of interest.

In an operation 608, the control signal may be transmitted to the identified one or more devices. Responsive to the control signal, the one or more devices may provide the haptic feedback.

Other aspects, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system of providing haptic feedback, the system comprising:
   a plurality of wearable devices configured to be worn at different body locations, each wearable device of the plurality of wearable devices comprising a haptic output device configured to output a haptic feedback; and
   a processor configured to:
      receive information related to an event associated with a transfer of digital content;

generate a first control signal based on the event;
identify a first wearable device, from the plurality of wearable devices, that is to receive the first control signal;
transmit to the first wearable device the first control signal to cause the haptic output device of the first wearable device to output a first haptic feedback, wherein the first wearable device is associated with a first physical body location;
generate a second control signal based on the event;
identify a second wearable device that is to receive the second control signal, wherein the second wearable device is identified from the plurality of wearable devices, and wherein the second wearable device is different from the first wearable device;
transmit to the second wearable device the second control signal to cause the haptic output device of the second wearable device to output a second haptic feedback wherein the second wearable device is associated with a second physical body location different from the first physical body location;
coordinate a provision of the first control signal and the second control signal based on the information related to the event associated with the transfer of the digital content; and
simulate, in coordination with the transfer of the digital content, a movement of haptic feedback from the first physical body location associated with the first wearable device to the second physical body location associated with the second wearable device based on the coordinated first control signal and the second control signal.

2. The system of claim 1, wherein each wearable device comprises a storage device configured to store the digital content, and/or a wearable device processor configured to process an instruction from the processor.

3. The system of claim 1, wherein the first wearable device and the second wearable device are associated with their respective physical body locations in a node map on a computing device, wherein the processor is part of the computing device.

4. The system of claim 1, wherein the information related to the event comprises an indication of a communication, an indication of the transfer of the digital content, an indication of an event occurring in a graphical user interface, an indication of an event occurring in a physical environment, an indication of an input, and/or an indication of an output.

5. The system of claim 1, wherein the haptic output device of the first wearable device is configured to project the first haptic feedback to the first physical body location from a distance.

6. The system of claim 1, wherein the information related to the event originates from a mobile communication device and wherein the plurality of wearable devices are separate from the mobile communication device.

7. The system of claim 1, wherein the processor is associated with a central control that at least partially controls the operation of the plurality of wearable devices.

8. The system of claim 1, wherein the processor is further configured to:
associate the first physical body location and the second physical body location with a particular function that is related to the event.

9. The system of claim 1, wherein the processor is configured to cause an increase in intensity or a decrease in intensity from the first haptic feedback to the second haptic feedback.

10. The system of claim 1, wherein the system is configured to associate the first wearable device with a first storage device and to associate the second wearable device with a second storage device, wherein the transfer of the digital content is from the first storage device to the second storage device.

11. The system of claim 1, wherein a source or destination of the transfer of the digital content is the first wearable device or the second wearable device.

12. The system of claim 1, wherein the processor is configured to simulate the movement along a path that is not linear.

13. A computer-implemented method of providing haptic feedback, the method comprising:
receiving, by a processor, information related to an event;
generating a first control signal based on the event;
identifying a first wearable device, from a plurality of wearable devices, that is to receive the first control signal;
transmitting to the first wearable device the first control signal to cause a haptic output device of the first wearable device to output a first haptic feedback, wherein the first wearable device is associated with a first physical body location;
generating a second control signal based on the event;
identifying a second wearable device that is to receive the second control signal, wherein the second wearable device is identified from the plurality of wearable devices, and the second wearable device is different from the first wearable device;
transmitting to the second wearable device the second control signal to cause a haptic output device of the second wearable device to output a second haptic feedback, wherein the second wearable device is associated with a second physical body location different from the first physical body location;
coordinating a provision of the first control signal and the second control signal based on the information; and
simulating a movement from the first physical body location associated with the first wearable device to the second physical body location associated with the second wearable device based on the coordinated first control signal and the second control signal.

14. The computer-implemented method of claim 13, wherein each wearable device comprises a storage device configured to store digital content, and/or a wearable device processor configured to process an instruction from the processor.

15. The computer-implemented method of claim 13, wherein identifying the first wearable device is based on the processor accessing a node map that maps the plurality of wearable devices to physical body locations.

16. The computer-implemented method of claim 13, wherein the information related to the event comprises an indication of a communication, an indication of a transfer of digital content, an indication of an event occurring in a graphical user interface, an indication of an event occurring in a physical environment, an indication of an input, and/or an indication of an output.

17. The computer-implemented method of claim 13, wherein the haptic output device of the first wearable device is configured to project the first haptic feedback to the first physical body location from a distance.

18. The computer-implemented method of claim 13, wherein the information related to the event originates from a mobile communication device and wherein the plurality of wearable devices are separate from the mobile communication device.

19. The computer-implemented method of claim 13, wherein the processor is associated with a central control that at least partially controls the operation of the plurality of wearable devices.

20. The computer-implemented method of claim 13, the method further comprising:
   associating the first physical body location and the second physical body location with a particular function that is related to the event.

* * * * *